United States Patent [19]

Kazumoto et al.

[11] Patent Number: 4,894,996
[45] Date of Patent: Jan. 23, 1990

[54] GAS REFRIGERATOR

[75] Inventors: Yoshio Kazumoto; Kazuo Kashiwamura; Yoshiro Furuishi; Takuya Suganami, all of Amagasaki City, Japan

[73] Assignee: Mitsubishi Denki Kabushiki Kaisha, Tokyo, Japan

[21] Appl. No.: 330,325

[22] Filed: Mar. 28, 1989

[30] Foreign Application Priority Data

Mar. 28, 1988 [JP] Japan .................. 63-73722
Jun. 8, 1988 [JP] Japan .................. 63-140962

[51] Int. Cl.⁴ .................. F25B 9/00
[52] U.S. Cl. .................. 62/6; 60/520
[58] Field of Search .................. 62/6; 60/520

[56] References Cited

U.S. PATENT DOCUMENTS

| | | | |
|---|---|---|---|
| 3,698,182 | 10/1972 | Knoos | 62/6 |
| 3,991,585 | 11/1976 | Mulder | 62/6 |
| 4,090,858 | 5/1978 | Hanson | 62/6 |
| 4,092,833 | 6/1978 | Durenec | 62/6 |
| 4,412,423 | 11/1973 | Durenec | 62/6 |
| 4,498,296 | 2/1985 | Distra et al. | 62/6 |

Primary Examiner—Ronald C. Capossela
Attorney, Agent, or Firm—Sughrue, Mion, Zinn, Macpeak & Seas

[57] ABSTRACT

A refrigerator comprising a cold finger having an expansion space and a first compression space defined by a displacer, a regenerator connected to the expansion space and the first compression space, a cylinder having a second compression space and a buffer space defined by a piston, and a communicating tube connecting the first compression space to the second compression space. The working space thus defined is filled with the working gas so that a thermodynamic cycle can be generated in the working gas within the working space to generate coldness within the expansio space by reciprocatingly moving the piston and the displacer with a predetermined phase relationship therebetween. The refrigerator further comprises a first passage having a check valve between the working space and the buffer space, and a second connecting passage connecting the drain space and the buffer space. A hydrostatic displacer bearing is provided for hydrostatically supporting the displacer against the cold finger utilizing a differential pressure of the working gas between the working space and the drain space.

16 Claims, 8 Drawing Sheets

FIG. I

PRIOR ART

F I G. 10
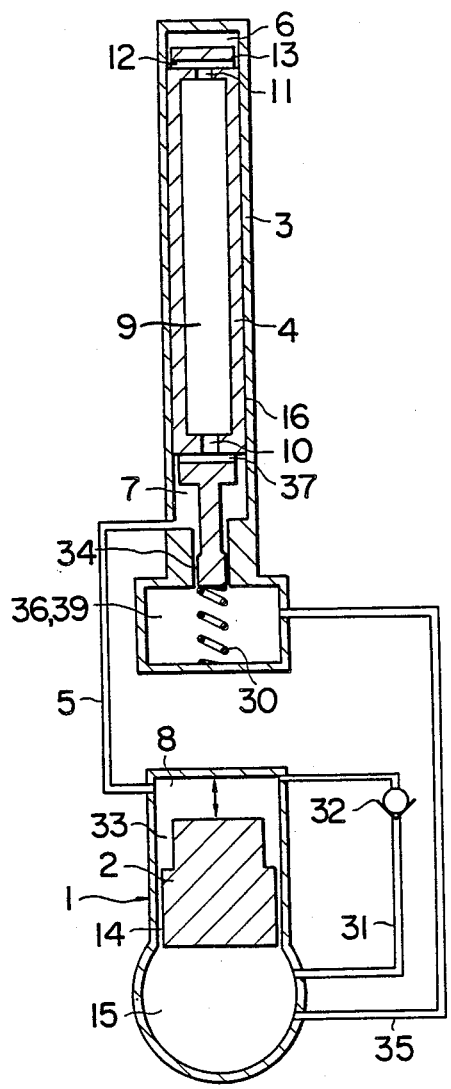

GAS REFRIGERATOR

BACKGROUND OF THE INVENTION

This invention relates to a gas refrigerator and more particularly to a gas refrigerator such as a Stirling refrigerator wherein refrigeration is provided in one portion of the working space by the reciprocating motion of a displacer.

FIG. 1 is a sectional side view showing the construction of the conventional refrigerator similar to the Stirling cycle gas refrigerator disclosed in U.S. Pat. No. 3,991,585 issued on November 16, 1976. In the FIG. 1 is a cylinder, in which a piston 2 makes a reciprocating motion. 3 is a cold finger having contained therein a reciprocating displacer 4 and connected at its lower portion to the cylinder 1 through a communication pipe 5. The displacer 4 has a working surface 4b at its uppor portion to define an expansion space 6. There are a first compression space 7 defined between a bottom working surface 4a of the displacer 4 and the communication pipe 5, a second compression space 8 defined between an upper working surface 2a of the piston 2 and the communication pipe 5, a space in a regenerator 9 within the displacer 4, and a space in the communication pipe 5. The above-mentioned spaces together difine a working space. The regenerator 9 may be communicated with the expansion space 6 disposed above the regenerator 9 and may be also communicated with the first compression space 7 below the regenerator 9. In the illustrated refrigerator, a freezer 13 is provided as a heat exchanger for the heat-exchange between the expanded, cold working gas and a matter to be cooled. Between the piston 2 and the wall of the cylinder 1, a seal 14 is disposed so that a flow of the working gas between a buffer space 15 defined below the piston 2 and the above-mentioned working space is prevented. Also, the narrow gap between the displacer 4 and the cold finger 3 constitutes a gap seal 16 so that this narrow gap ensures that the flow of the working gas between the expansion space 6 and the first compression space 7 is forced to extend through the regenerator 9.

The piston 2 has disposed within the buffer space 15 below the piston 2 a sleeve 17 made of a non-magnetic and non-magnetizable material such as aluminium. A length of conductor is wound around the sleeve 17 to form a coil 18 which is connected to lead wires 19 and 20 extending through the wall of the cylinder 1 and connected to electrical terminals 21 and 22, respectively, at the outside of the cylinder 1. The coil 18 is allowed to reciprocatingly move in the direction of axis of the piston 2 within an annular gap 23 in which an armature magnetic field is generated. The lines of force of this armature magnetic field extend in the radial direction transversely of the direction of movement of the coil 18. In this case, the permanent magnet is constituted by a ring-shaped magnet field 24 having an upper and a lower magnetic pole, a soft-iron ring-shaped disc 25, a soft-iron cylinder 26 and a soft-iron circular disc 27. The ring-shaped permanent magnet 24, the soft-iron ring-shaped disc 25, the soft-iron cylinder 26 and the soft-iron circular disc 27 together define a closed magnetic circuit or a closed circuit for lines of magnetic force. The above-mentioned sleeve 17, the coil 18, the leads 19, 20, the annular gap 23, the ring-shaped permanent magnet 24, the soft-iron ring-shaped disc 25, the soft-iron cylinder 26 and the soft-iron circular disc 27 together constitute a linear motor 28 for driving the piston. The piston 2 and the displacer 4 are reciprocatingly movably inserted within the cylinder 1 and the cold finger 3 through the piston elastic member 29 and the displacer elastic member 30, respectively, whereby the piston 2 and the displacer 4 are determined as to their fixed position while they are stationary and the neutral position during operation.

The operation of the above-described conventional Stirling cycle gas refrigerator will now be described. When an a.c. source (not shown) having a resonance frequency equal to that of the system is connected across the electrical terminals 21 and 22, a circumferential alternating current flows through the coil 18, so that a periodical axial Lorentz force acts upon the coil 18 due to the alternating current and the radial magnetic field generated by the ring-shaped permanent magnet 24. Therefore, the system which comprises the assembly composed of the piston 2, the sleeve 17 and the coil 18 and the piston elastic member 29 is brought into a resonate state, causing the above assembly to oscillate in the axial direction. The oscillation of the piston 2 causes a periodic pressure change in the working gas filled within the working space composed of the expansion space 6, the first compression space 7, the second compression space 8, the communication pipe 5, the regenerator 9, the central bore 10, the central bore 11, the radial-direction flow duct 12 and the freezer 13. This oscillation of the piston 2 also causes an periodic, axial alternating oscillation of the displacer 4 due to the change in the gas flow rate flowing through the regenerator 9. Thus, the displacer 4 including the regenerator 9 axially and reciprocatingly moves within the cold finger 3 at a frequency equal to that of the piston but at a phase different from that of the piston.

When the piston 2 and the displacer 4 move with a proper phase difference maintained therebetween, the working gas filled within the working space constitutes a thermodynamic cycle known as "the reverse Stirling cycle", generating coldness primarily in the expansion space 6 and the freezer 13. The detail of the reverse Stirling cycle and its principles of generating the coldness are explained in "Cryocoolers" G. Walker, Plenum Press, New York, 1983, pp. 177–123. The brief explanation of its principles will now be made.

The gas within the second compression space 8 compressed by the piston 2 is cooled while it is flowing through the communication pipe 5 and flows into the regenerator 9 through the first compression space 7 and the central bore 10. The working gas is pre-cooled by the coldness which accumulated in the regenerator 9 one half-cycle before and flows into the expansion space 6 through the central bore 11, the radial flow duct 12 and the freezer 13. When most of the working gas reaches the expansion space 6, the expansion of the working gas initiates to generate coldness within the expansion space 6. The working gas then flows through the passage backward while dissipating the coldness into the regenerator 9 to enter into the second working space 8, during which the gas absorbes the external heat in the freezer 13 to cool its exterior. When most of the working gas returns to the second working space 8, the compression starts again, restarting the next cycle. With the above-outlined process, the "Stirling cycle" is completed and coldness is generated.

Since the conventional refrigerator is constructed as above described, when the gap seal 16 is worn by the reciprocating motion of the displacer 4, the direct flow of the working gas between the expansion space 6 maintained at a low temperature and the first compression space 7 at a room temperature increases, degrading the cooling capability, disadvantageously reducing the operating life of the refrigerator. Also, the wear particles formed by wearing of the gap seal 16 clog the flow path of the regenerator 9 or the like to make the refrigerator inoperative, decreasing the reliability.

SUMMARY OF THE INVENTION

Accordingly, an object of the present invention is to provide a refrigerator free from the above problems in the conventional refrigerator.

Another object of the present invention is to provide a refrigerator of a long life.

Still another object of the present invention is to provide a reliable refrigerator.

With the above object in view, the refrigerator of the present invention has connected the working space and the buffer space by a first connecting circuit with a check valve, the cold finger is provided with a drain space which is connected to the buffer space by a second connecting circuit, and a displacer hydrostatic bearing operated by the pressure difference between the working gas within the working space and the drain space at the sliding contact portion between the displacer and the cold finger.

In addition to the displacer hydrostatic bearing, a piston hydrostatic bearing oeprated by the pressure difference between the working space and the buffer space may be provided at the sliding contact portion between the piston and the cylinder.

In the refrigerator of the present invention, the working space and the buffer space are connected by the first connecting circuit having the check valve so that the pressure is always higher in the working space than in the buffer space, and the drain space within the cold finger and the buffer space are connected by the second connecting circuit so that they are at the same pressure, and the hydrostatic bearing operated by the pressure difference between the working space and the draing space is disposed at the sliding contact portion between the displacer and the cold finger, so that the displacer moves in a non-contacting relationship with respect to the cold finger, eliminating the wear of the seal member.

BRIEF DESCRIPTION OF THE DRAWINGS

The present invention will become more readily apparent from the following detailed description of the preferred embodiments of the present invention taken in conjunction with the accompanying drawings, in which:

FIG. 10 is a sectional side view of a further embodiment of the refrigerator of the present invention.

DESCRIPTION OF THE PREFERRED EMBODIMENTS

Figure 1:
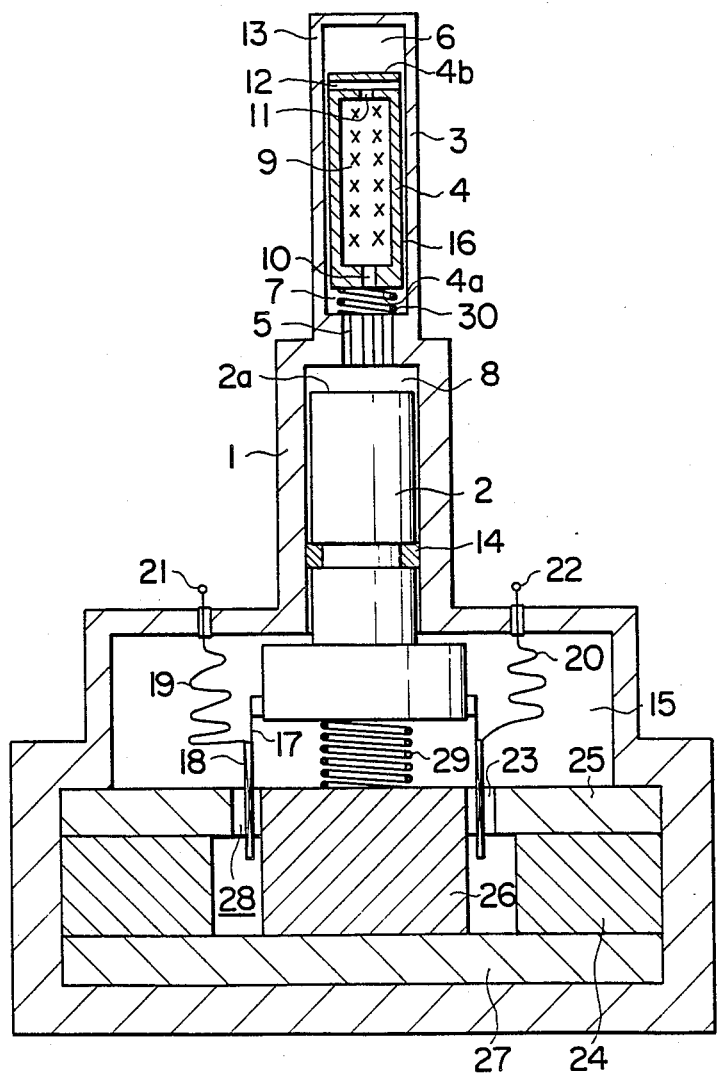
FIG. 1 is a sectional side view of the conventional refrigerator.
Figure 2:
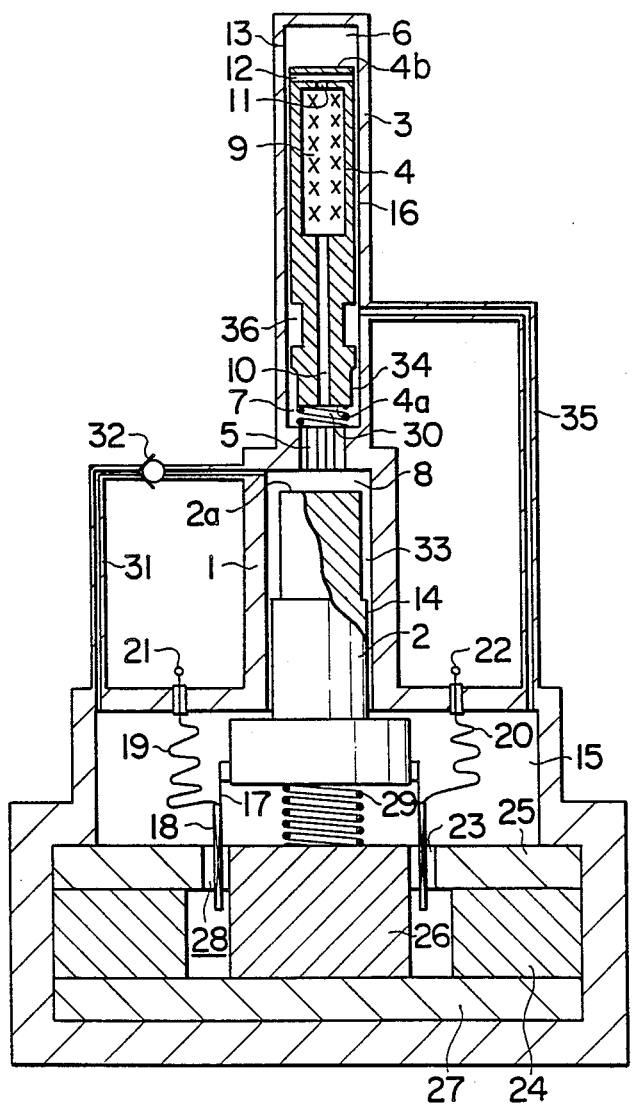
FIG. 2 is a sectional side view of one embodiment of the refrigerator of the present invention.

One embodiment of the present invention will now be described in conjunction with the drawings. FIG. 2 is a sectional side view illustrating a refrigerator of one embodiment of the present invention, in which the components corresponding to or the same as those shown in FIG. 1 are designated by identical reference characters and their detailed description is omitted.

In FIG. 2, the working space (the second compression space) 8 is connected to the buffer space 15 by a first connection circuit 31 which has inserted therein a check valve 32 for allowing the flow of the working gas only from the buffer space 15 to the second compression space 8. In the above embodiment, a narrow gap defined between the piston 2 and the cylinder 1 functions as a gap seal 14. Also, by arranging this gap to have a greater width on the side of the second compression space 8 as compared to the side of the buffer space 15, a hydrostatic bearing 33 for supporting the piston of the surface constriction type can be provided between the piston 2 and the cylinder 1 so that the piston 2 can reciprocatingly move in a non-contacting relationship relative to the cylinder 1 due to the pressure difference between the second compression space 8 and the buffer space 15.

In the sliding contact portion between the cold finger and the displacer, a drain space 36 connected to the buffer space 15 by the second connecting circuit 35 is defined, and the gap between the displacer 4 and the cold finger 3 has provided on the side of the first compression space 7 with a hydrostatic bearing 34 for supporting the displacer of the surface constriction type which defines a larger gap with respect to the first compression space 7, so that the displacer 4 can reciprocatingly move in a non-contacting relationship with the cold finger 3 by utilizing the pressure difference between the workig space (the first compression space) 7 and the drain space 36.

On the other hand, the narrower gap on the side of the expansion space 6 between the displacer 4 and the cold finger 3 functions as the seal 16.

Figure 3:
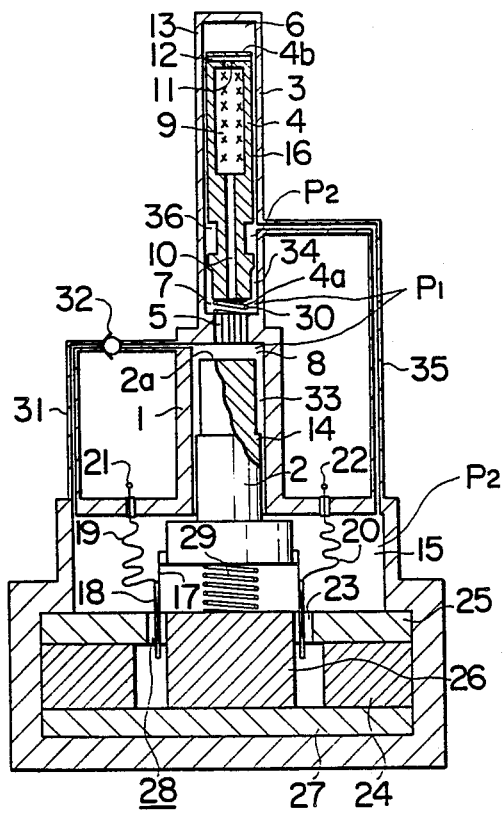
FIG. 3 is sectional side view of the refrigerator of the present invention for explaining the pressure at various portions.
Figure 4:
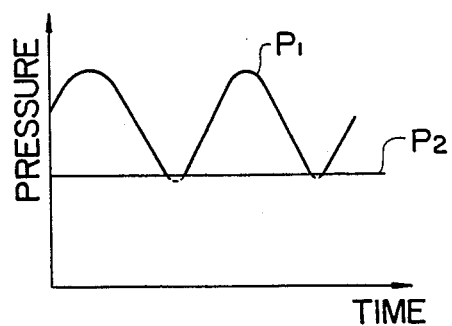
FIG. 4 is a graph showing the change in pressure within the refrigerator shown in FIG. 3.

The operation of the above embodiment will now be described in terms of FIGS. 3 and 4. As has been described in connection with the operation of the conventional design, when an a.c. power source (not shown) is connected to the terminals 21 and 22, the piston 2 and the displacer 4 reciprocatingly move in a non-contacting relationship within the cylinder 1 and the cold finger 3, respectively, to generate a periodic pressure variation $P_1$ within the working space (see FIG. 4). On the other hand, since the second compression space 8 and the buffer space 15 are communicated with each other by the first connecting circuit 31 and the check valve 32 so that the working gas is allowed to flow only from the buffer space 15 to the second compression space 8, the pressure variation $P_1$ relative to the working gas pressure $P_2$ within the buffer space 15 which is maintained substantially constant is, as shown in FIG. 4, within the range expressed by the following equation:

$$P_1 \geqq P_2 \quad (1)$$

Figure 5:
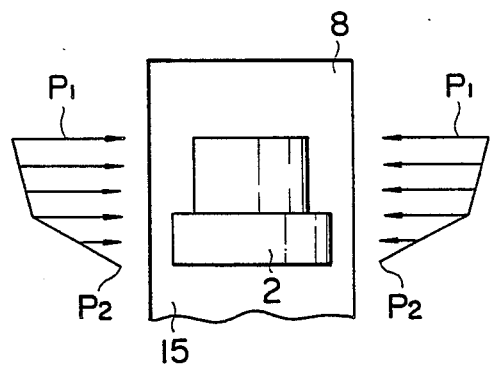
FIG. 5 is a schematic diagram illustrating the operation of the hydrostatic bearing of the refrigerator of the present invention when the piston is centrally positioned in the cylinder.

When the pressure $P_1$ within the working space and the pressure $P_2$ within the buffer space 15 and the drain space 36 equal to the buffer space satisfies the above equation (1), a force, which maintains the distance between the piston 2 and the cylinder 1 and the displacer 4 and the cold finger 3 constant by the action of the hydrostatic bearings 33 and 34 explained in conjunction with FIG. 5, is exerted to the piston 2 and the displacer 4, whereby the piston 2 and the displacer 4 reciprocatingly move in a non-contacting manner relative to the cylinder 1 and the cold finger 3.

Figure 6:
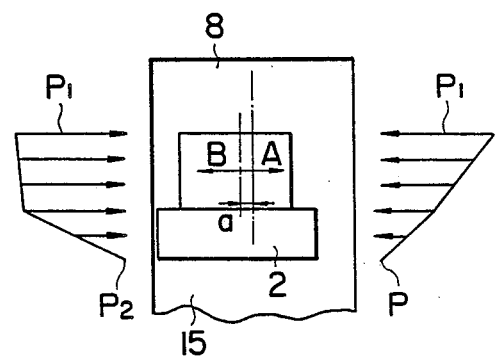
FIG. 6 is a schematic diagram similar to FIG. 5 but illustrating the piston in the eccentric position.

FIGS. 5 and 6 illustrate operating principle of the surface constriction type hydrostatic bearing used in the above embodiment. When the center of the piston 2 and the center of the cylinder 1 coincide as illustrated in FIG. 5, the pressure on the side surface of the piston 2 is equal at the radially opposite positions and in a balanced state. When the piston 2 and the cylinder 1 are in an eccentric relationship, the pressure on the side in which the gap becomes smaller by an offset a becomes higher than the pressure on the opposite side, urging the piston 2 to return to the position in which the piston 2 and the cylinder 1 are placed coincide by a reaction force A. This function means that the piston side load B can be supported by the piston 2 while it is being floated relative to the cylinder 1, enabling that the piston 2 and the displacer 4 to reciprocatingly move in an non-contacting relationship.

During the reciprocating movement of the piston 2 and the displacer 4 with a suitable phase difference therebetween, a coldness is generated within the expansion space 6 to generate as a refrigerator. The detailed description of the process will be omitted because it is similar to that of the conventional design.

Figure 7:
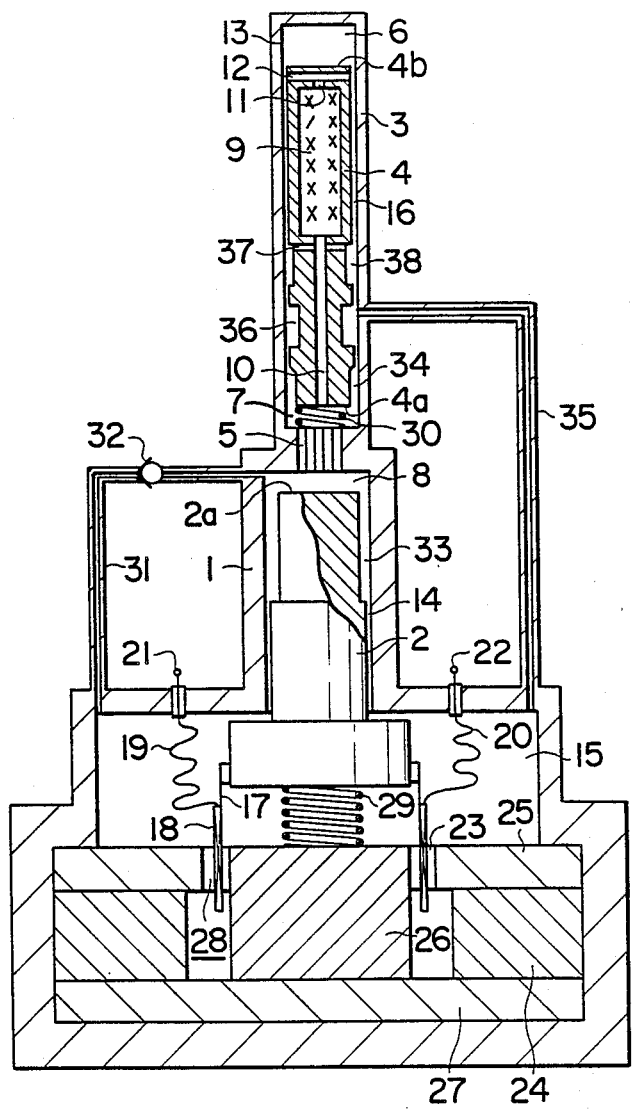
FIG. 7 is a sectional side view of another embodiment of the refrigerator of the present invention.
Figure 8:
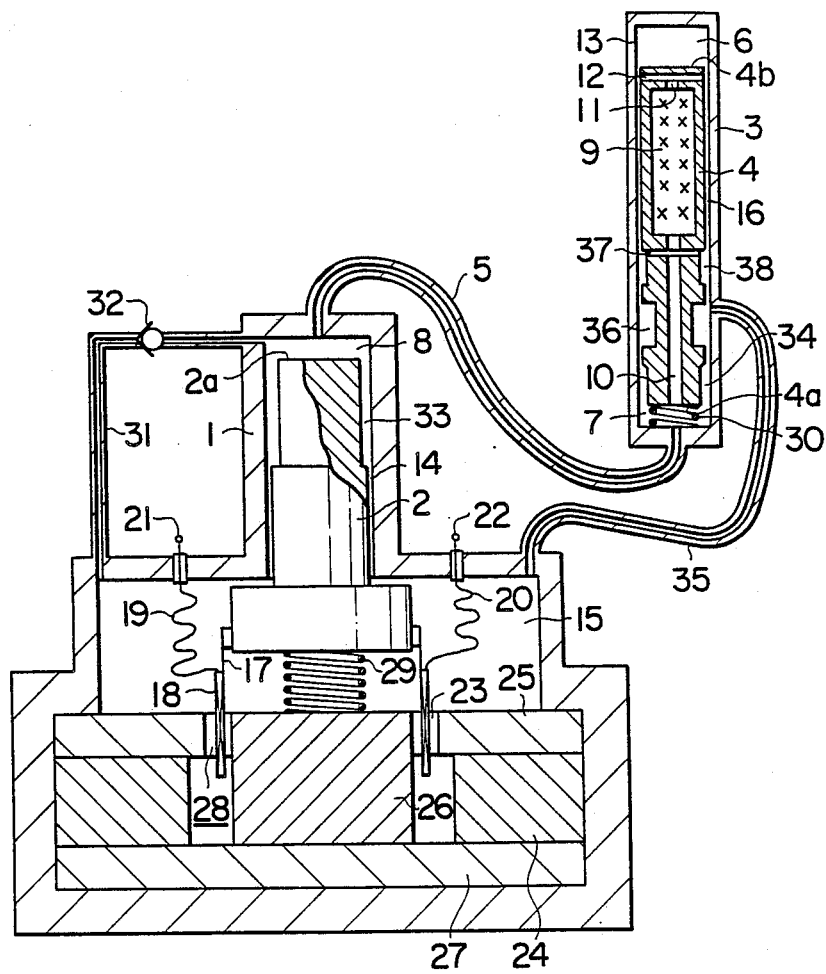
FIG. 8 is a sectional side view of still another embodiment of the refrigerator of the present invention.

In the above-described embodiment, the hydrostatic bearing 34 for the displacer is provided only on the side of the first compression space 7 in the displacer 4, the hydrostatic bearing may be provided on the other side of the expansion space 6 or on the both sides. Alternatively, as shown in FIG. 7, the pressure within the working space may be introduced from the central bore 10 into the displacer hydrostatic bearing 38 through a second radial communication duct 37. Further, while the description has been made in terms of the built-in type refrigerator in which the cylinder 1 and the cold finger 3 are firmly connected, advantageous results similar to those of the above embodiment can be obtained with a separate type refrigerator as shown in FIG. 8 in which the cylinder 1 and the cold finger 3 are separated from each other by the communication pipe 5.

Figure 9:
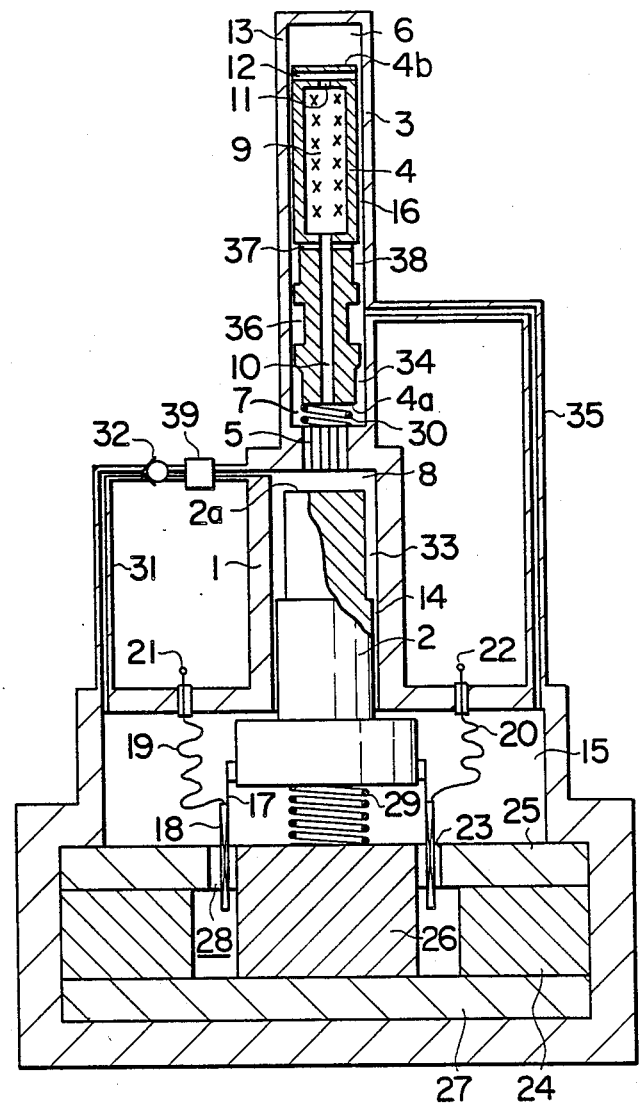
FIG. 9 is a sectional side view of another embodiment of the refrigerator of the present invention.

Also, as shown in FIG. 9, by providing an absorption chamber 39 for trapping worn powder particles in the first connecting circuit 31, the powder particles entrained in the working gas can be reduced, further increasing the reliability of the refrigerator.

While the piston elastic member 29 and the displacer elastic member 30 of the refrigerator are explained as being mechanical springs in the above embodiments, a gas spring using the working gas and a magnetic repulsive force may be used to obtain similar advantageous results.

Also, the hydrostatic bearing is disposed on each of the piston and the displacer in the above embodiments, the hydrostatic bearing may be provided only on either one of them. Also, the hydrostatic bearing may be of other configuration or type such as the channel-type, or the orifice-constriction type, etc. other than the stepped surface constriction type.

Further, as shown in FIG. 10, the drain space 36 may be disposed on the end portion of the first compression space 7 of the displacer 4 to utilize the drain space 36 as a gas spring space 40. In this figure, a linear motor 28 for driving the piston is omitted.

As has been described, in the refrigerator according to the present invention, a working space and a buffer space are connected by a first connecting circuit having inserted therein a check valve, a cold finger has defined therein a draing space connected to the buffer space by a second connecting circuit, and a displacer hydrostatic bearing, which operates due to the pressure difference between the working space within the cold finger and the drain space, is provided in a sliding contact portion between the displacer and the cold finger, so that the displacer can be reciprocatingly moved in a non-contacting manner, eliminating the wearing of the seal and the bearing, providing a long-life, highly reliable refrigerator.

When a piston hydrostatic bearing which operates by the pressure difference between the working space and the buffer space is provided in the sliding contact portion between the piston and the cylinder, the piston can also be reciprocatingly moved in a non-contacting relationship, free from wearing and a long-life, highly reliable refrigerator can be obtained.

What is claimed is:

1. A refrigerator comprising:
    a cold finger in which a working gas is filled;
    A displacer disposed within said cold finger and defining therein an expansion space and a first compression space, said displacer being reciprocatingly movable to change volumes of said expansion space and said first compression space;
    a regenerator communicating with said expansion space and said first compression space;
    a cylinder in which a working gas is filled;
    a piston disposed within said cylinder and defining therein a second compression space and a buffer space, said piston being reciprocatingly movable to change volumes of said second compression space and said buffer space;
    a communication pipe communicating said first compression space to said second compression space;
    said expansion space, said first compression space, said commmunication pipe, said second compression space and said regenerator defining a working space filled with the working gas;
    wherein a thermodynamic cycle can be generated in said working gas within said working space to generate coldness within said expansion space by reciprocatingly moving said piston and said displacer with a predetermined phase relationship therebetween;
    a first connecting circuit having a check valve therein and connecting said working space and said buffer space;
    said cold finger defining therein a drain space;
    a second connecting circuit connecting said drain space and said buffer space; and
    a hydrostatic displacer bearing disposed between said displacer and said cold finger for hydrostatically supporting said displacer against said cold finger utilizing a pressure difference of the working gas between said working space and said drain space.

2. A refrigerator as claimed in claim 1, wherein said drain space is provided in one end portion of said displacer close to said first compression space and is utilized as a gas spring space.

3. A refrigerator as claimed in claim 2, wherein said hydrostatic displacer bearing is a surface-reduction type hydrostatic bearing.

4. A refrigerator as claimed in claim 2, wherein said first connecting circuit includes an absorption chamber for absorbing impurities and foreign matters entrained in the gas.

5. A refrigerator as claimed in claim 2, wherein said hydrostatic displacer bearing is a surface-reduction type hydrostatic bearing, and said first connecting circuit includes an absorption chamber for absorbing impurities and foreign matters entrained in the gas.

6. A refrigerator as claimed in claim 2, further comprising means disposed between said displacer and said cold finger for correcting the position of the reciprocating movement of said displacer.

7. A refrigerator as claimed in claim 2, further comprising means diposed between said displacer and said cold finger for correcting the position of the reciprocating movement of said displacer, said hydrostatic displacer bearing is a surface-reduction type hydrostatic bearing.

8. A refrigerator as claimed in claim 2, further comprising means diposed between said displacer and said cold finger for correcting the position of the reciprocating movement of said displacer, and said means for correcting the position of the reciprocating movement of said displacer comprises a mechanical spring connected between said displacer and said cold finger.

9. A refrigerator as claimed in claim 2, further comprising means diposed between said displacer and said cold finger for correcting the position of the reciprocating movement of said displacer, said hydrostatic displacer bearing is a surface-reduction type hydrostatic bearing, and said means for correcting the position of the reciprocating movement of said displacer comprises a mechanical spring connected between said displacer and said cold finger.

10. A refrigerator as claimed in claim 2, further comprising a hydrostatic displacer bearing disposed between said piston and said cylinder for hydrostatically supporting said piston against said cylinder utilizing a pressure difference of the working gas between said working space and said buffer space.

11. A refrigerator as claimed in claim 1, wherein said hydrostatic displacer bearing is a surface-reduction type hydrostatic bearing.

12. A refrigerator as claimed in claim 1, wherein said first connecting circuit includes an absorption chamber for absorbing impurities and foreign matters entrained in the gas.

13. A refrigerator as claimed in claim 1, wherein said hydrostatic displacer bearing is a surface-reduction type hydrostatic bearing, and said first connecting circuit includes an absorption chamber for absorbing impurities and foreign matters entrained in the gas.

14. A refrigerator as claimed in claim 1, further comprising means disposed between said displacer and said cold finger for correcting the position of the reciprocating movement of said displacer, and said hydrostatic displacer bearing is a surface-reduction type hydrostatic bearing.

15. A refrigerator as claimed in claim 1, further comprising means diposed between said displacer and said cold finger for correcting the position of the reciprocating movement of said displacer, and said hydrostatic displacer bearing is a surface-reduction type hydrostatic bearing, and said means for correcting the position of the reciprocating movement of said displacer comprises a mechanical spring connected between said displacer and said cold finger.

16. A refrigerator as claimed in claim 1, further comprising a hydrostatic displacer bearing disposed between said piston and said cylinder for hydrostatically supporting said piston against said cylinder utilizing a pressure difference of the working gas between said working space and said buffer space.

* * * * *